United States Patent [19]
Barkats

[11] Patent Number: 5,615,407
[45] Date of Patent: Mar. 25, 1997

[54] SATELLITE COMMUNICATIONS SYSTEM USING AN INTERMEDIATE SATELLITE TO PROVIDE SAME FREQUENCY UPLINK AND DOWNLINK

[75] Inventor: Gérard Barkats, Peymeinade, France

[73] Assignee: Aerospatiale Societe Nationale Industrielle, France

[21] Appl. No.: 365,836

[22] Filed: Dec. 29, 1994

[30] Foreign Application Priority Data

Dec. 31, 1993 [FR] France .................. 93 15972

[51] Int. Cl.$^6$ .................................. H04B 7/185
[52] U.S. Cl. ................ 455/13.1; 455/20; 455/63
[58] Field of Search .................. 455/12.1, 13.1, 455/13.3, 15, 16, 20, 25, 63; 342/352, 353; 370/104.1

[56] References Cited

U.S. PATENT DOCUMENTS

| | | | |
|---|---|---|---|
| 4,004,098 | 1/1977 | Shimasaki | 455/13.1 |
| 4,287,588 | 9/1981 | Segner | 370/104.1 |
| 4,375,697 | 3/1983 | Visher | 455/13.1 |
| 4,689,625 | 8/1987 | Barmat | 342/353 |
| 4,691,882 | 9/1987 | Young | 455/13.1 |
| 4,701,935 | 10/1987 | Namiki | 455/16 |

FOREIGN PATENT DOCUMENTS

| | | | |
|---|---|---|---|
| 60-57736 | 4/1985 | Japan | 455/13.1 |
| 9200632 | 1/1992 | WIPO . | |

*Primary Examiner*—Reinhard J. Eisenzopf
*Assistant Examiner*—Lester G. Kincaid
*Attorney, Agent, or Firm*—Remy J. VanOphem; Thomas A. Meehan; John VanOphem

[57] ABSTRACT

For exchange of information between an earth-station and a satellite in geostationary orbit, information signals addressed to the satellite are transmitted from the earth-station, and information signals from the satellite are received at the earth-station. Signals addressed to the satellite and the signals from the satellite have a common first carrier frequency. Signals addressed to the satellite are transmitted to an intermediate satellite with an angular offset from the satellite in geostationary orbit. The intermediate satellite retransmits signals laterally to the geostationary orbit satellite on a second carrier frequency different from the first carrier frequency.

14 Claims, 2 Drawing Sheets

SATELLITE COMMUNICATIONS SYSTEM USING AN INTERMEDIATE SATELLITE TO PROVIDE SAME FREQUENCY UPLINK AND DOWNLINK

BACKGROUND OF THE INVENTION

1. Field of the Invention

The invention concerns the transmission of signals between an earth-station and a spacecraft in geostationary orbit.

2. Description of the Prior Art

There are already many stabilized satellites in an orbit such that the satellites remain at all times vertically above a particular place on the Earth. Such satellites are called geostationary satellites for short.

Geostationary satellites are usually remote sensing satellites or telecommunication satellites.

In fulfilling their mission, geostationary satellites exchange signals with the Earth.

Geostationary satellites are sometimes replaced with groups of small satellites with one serving as a relay station for the others, for example as described in French Patent 2,539,102.

Because of the large number of geostationary satellites and because, to remain geostationary, they must all be in the same orbit (an equatorial orbit at 36,000 km altitude), very strict international rules have been drawn up to cover both their positioning and the methods of earth-satellite transmission. In particular, these rules allocate different frequencies for uplink transmission (from the Earth to the satellite) and for downlink transmission (from the satellite to the Earth); the main reason These international rules are embodied in an international treaty which is legally binding on all member states of the International Telecommunications Union, which includes France.

The first frequency bands allocated to satellite operators were chosen in the "low" frequencies, i.e. in the C band (typically from 4 GHz to 6 GHz). Once this band had become saturated, the frequency bands allocated were chosen in progressively higher bands (including the Ku band (beyond 12 GHz) and even the Ka band (from 20 GHz to 30 GHz)).

One constraint arising out of the increasing values of the frequencies allocated is that increasing the frequency requires an increase in transmission power (among other reasons because of absorption by the atmosphere) and therefore more sophisticated and more costly technology.

Each satellite is allocated a "slot" in the orbit defined with an angular accuracy (as seen from the Earth) of ±0.1° (which is equivalent to a parallelepiped 180 km long with a cross section 80 km×80 km) and two frequencies different from those allocated to the adjoining slots and different from each other to make the uplink and downlink independent. These frequencies are allocated in bands 250 MHz wide but because the ranges and frequencies available are finite and the numbers of signals to be transmitted in a band and the multiplexing capacities are limited the narrowness of the bands allocated has not prevented saturation and the need for ever higher frequencies.

An object of the invention is to enable use of the same frequency for the uplink and the downlink, without risk of interferences, to again make available frequency bands in the "low" frequencies, especially but not necessarily in the C band, and to recognize the ever increasing demand for frequencies.

SUMMARY OF THE INVENTION

In one aspect, the present invention proposes a method for exchange of information between an earth-station and a satellite in geostationary orbit in which information signals addressed to the satellite are transmitted from the earth-station and information signals from the satellite are received at the earth-station, wherein the signals addressed to the satellite and the signals from the satellite have a common first carrier frequency. The signals addressed to the satellite are transmitted to an intermediate satellite with an angular offset from the satellite in the geostationary orbit, and the intermediate satellite retransmits the signals laterally to the satellite in geostationary orbit on a second carrier frequency different from the first carrier frequency.

In accordance with preferred features of the invention:

the second carrier frequency is higher than the first carrier frequency, the second carrier frequency is equal to at least 30 GHz, the signals transmitted to the intermediate satellite are received in parallel with other signals transmitted on the first carrier frequency by other earth-stations and the signals retransmitted toward the satellite in geostationary orbit at a second carrier frequency are obtained by multiplexing signals received from the earth-station and other earth-stations, the retransmitted signals being demultiplexed after reception by the satellite in geostationary orbit, the intermediate satellite has an angular offset relative to the satellite in geostationary orbit equal to at least 2°, the angular offset is equal to at least 10°, and the intermediate satellite is also in the geostationary orbit.

In a second aspect the invention resides in a system for transmitting information between an earth-station and a satellite in geostationary orbit, the earth-station including a transmitter and a receiver and the satellite including a receiver and a transmitter. The system further includes on an intermediate satellite offset angularly from the satellite in geostationary orbit an intermediate receiver and an intermediate transmitter. The Earth transmitter and the intermediate receiver are pointed towards each other and tuned to a first carrier frequency. The intermediate transmitter and the satellite receiver are pointed laterally towards each other and tuned to a second carrier frequency, and the satellite transmitter and the earth-station receiver are pointed towards each other and tuned to the first carrier frequency.

In accordance with preferred features of the invention:

the second carrier frequency is higher than the first carrier frequency, the second carrier frequency is equal to at least 30 GHz, the Earth transmitter and the Earth receiver having a pointing difference equal to at least 2°, the pointing difference is equal to at least 10°, the intermediate satellite receiver and the intermediate satellite transmitter conjointly include a receive antenna with multiple outlets, a receiver stage, an amplifier stage, a multiplexer and transmitter stage and a transmit antenna with a single input and the satellite receiver and the satellite transmitter conjointly include a receive antenna with a single output, a demultiplexer stage, a receiver stage, an amplifier stage, a transmitter stage and a transmit antenna with multiple inputs, and the intermediate satellite is in the geostationary orbit and the intermediate satellite transmitter and the geostationary orbit satellite receiver are pointed toward each other in the plane of the geostationary orbit.

The invention exploits the fact that there are free slots in the geostationary orbit which are not considered as particularly desirable as they are not vertically over areas of interest (they are over oceans, for example) and it is therefore easy to find, for any wanted position in which a satellite is to be located to provide a good geographical coverage for downlink information, a secondary location away from the wanted location to be used for the triangular circulation of information as defined above.

Objects, features and advantages of the invention emerge from the following description given by way of non-limiting example with reference to the appended drawings.

DETAILED DESCRIPTION OF THE PREFERRED EMBODIMENTS

Figure 1:
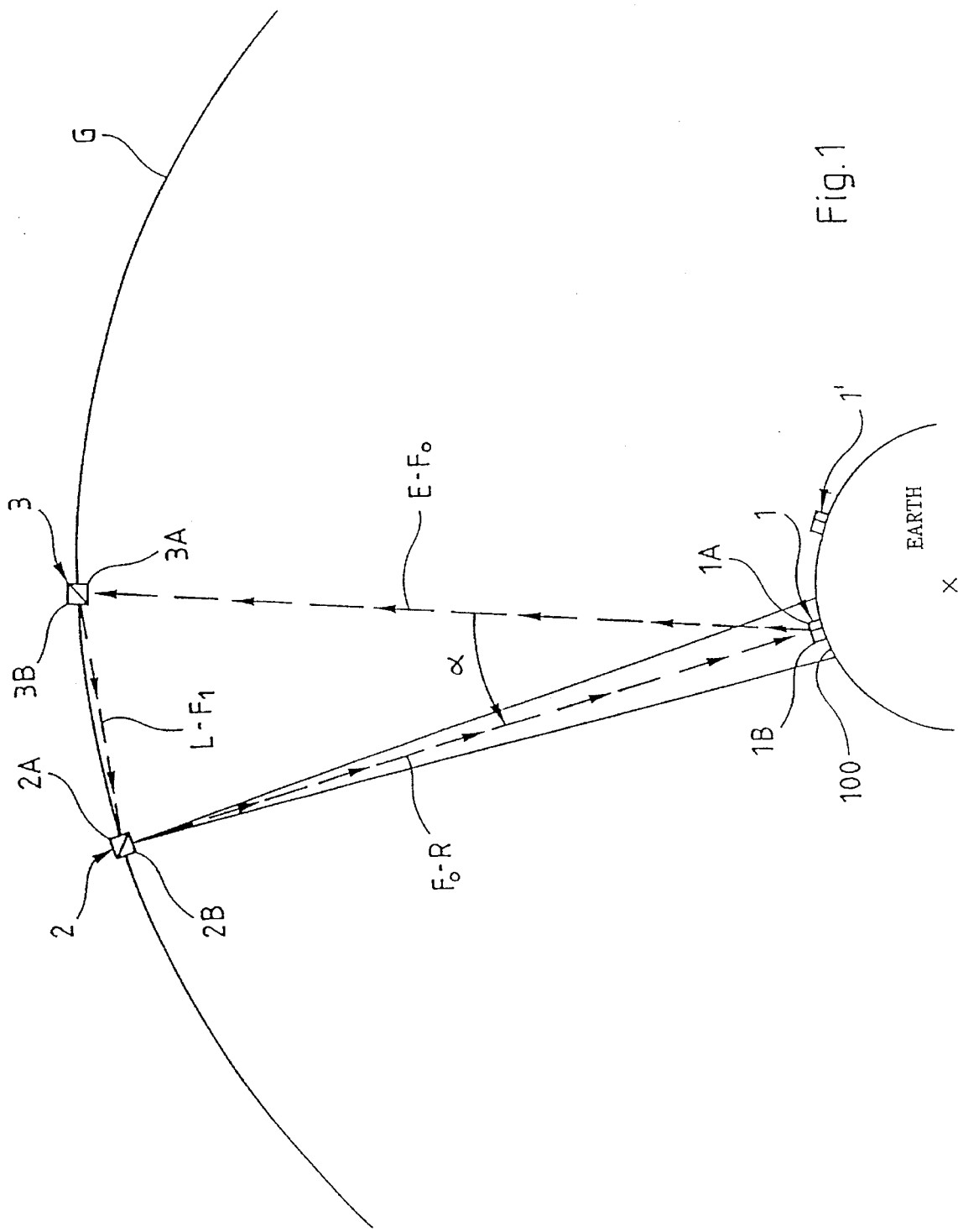
FIG. 1 is a diagram showing the principle of a communication installation in accordance with the invention.

FIG. 1 shows an earth-station 1, a geostationary main satellite 2 in geostationary orbit G and substantially vertically above the station (in practice at substantially the same longitude) and providing coverage over an area 100 on the ground including the station 1, and an intermediate satellite 3 at a distance from the main satellite 2, preferably but not necessarily in the orbit G. The directions 1-2 and 1-3 are at an angle α to each other.

The earth-station 1 includes a transmitter 1A adapted to transmit in a direction E uplink signals to the intermediate satellite 3 and a receiver 1B adapted to receive in a direction R downlink signals from the geostationary satellite 2.

The intermediate satellite 3 carries a receiver 3A adapted to receive in the direction E uplink signals from the earth-station 1 and a transmitter 3B adapted to transmit laterally, i.e. in a direction L, lateral signals to the main satellite 2.

The geostationary main satellite 2 carries a receiver 2A adapted to receive laterally, i.e. in the direction L, lateral signals from the intermediate satellite 2 and a transmitter 2B adapted to transmit downlink signals, for example to the earth-station 1.

The uplink signals in the direction E and the downlink signals in the direction R are transmitted at the same carrier (or center) frequency $F_0$ and the lateral signals transmitted in the direction L are transmitted at a separate carrier frequency $F_1$.

The frequency $F_0$ is as low as possible to minimize the power required for transmission on the link 1-3 or 2-1; the frequency $F_0$ is preferably in the C band or the Ku band; this frequency therefore is in a band where there is currently a shortage of available frequencies.

The angle α between the directions E and R must be sufficiently large to enable adequate discrimination at the station between the transmitted and received beams. The angle is directly proportional to the aperture of the antennas on the Earth (i.e. inversely proportional to their diameter).

For example, for antennas on the Earth with a diameter of only 1 m (worst case) and a frequency up to 12 GHz (worst case), the aperture of the antennas on the Earth is less than or equal to 1.75°; it is then sufficient to choose for α a value greater than 10° to obtain good discrimination (good isolation of the uplink and downlink beams), even with relatively unsophisticated antennas on the Earth.

To facilitate transmit/receive discrimination on the Earth, to enable lower values of α to be used, different polarizations (e.g. right-hand or left-hand) can be applied to the uplink signals (at 1A) and downlink signals (at 2B). Values of a few degrees may then be sufficient for α.

On the other hand, the frequency $F_1$ at which the main and intermediate satellites 2 and 3 communicate can be much higher (there is no absorption by the atmosphere requiring a high transmitter output power), in a range of frequencies where there is no shortage of available frequencies (frequencies from 30 GHz to 50 GHz, for example).

Figure 2:
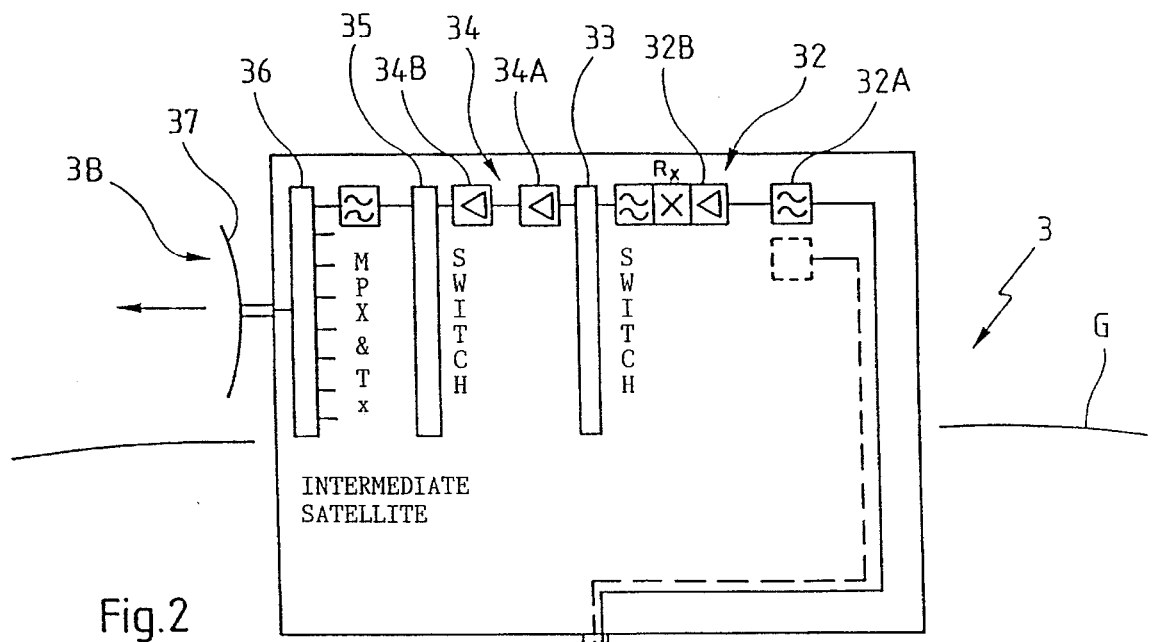
FIG. 2 is a diagram showing the principle of the transmit-receive system of the intermediate satellite from FIG. 1.
Figure 3:
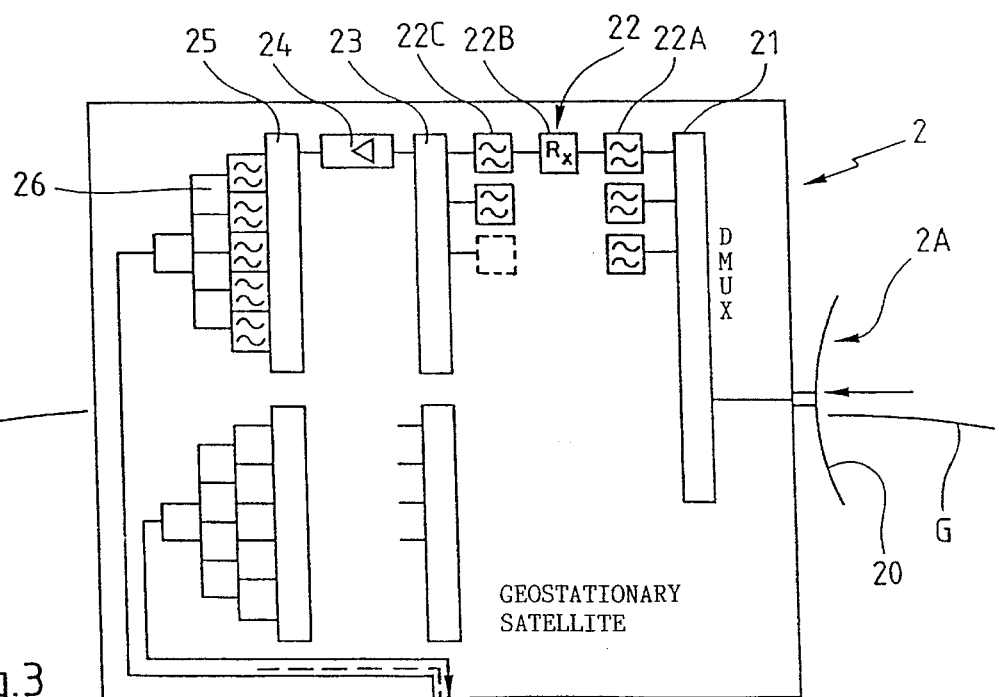
FIG. 3 is a diagram showing the principle of the transmit-receiver system of the main satellite from FIG. 1.

The main and intermediate satellites 2 and 3 are shown in more detail, but schematically, in FIGS. 3 and 2, respectively.

The transmitter and receiver on the Earth are of any appropriate known type.

The main and intermediate satellites 2 and 3 are described in the situation in which each uses the same carrier frequency for multiplexed transmission of signals to eight separate but adjacent areas on the Earth (i.e. eight earth-stations, generally reference as 1' in FIG. 1).

The intermediate satellite 3 in FIG. 2 has a receive antenna 30 (which is part of the receiver 3A) and eight unit antennas 31 each adapted to receive a different beam with an aperture of around 1° to 2°.

This antenna provides eight outputs which are applied to the input of eight parallel channels.

Each channel has at the input a decoder stage 32 including an input filter 32A driving a radio frequency receiver circuit 32B.

The output of the decoder stage is fed to a switching system 33.

This is followed by a high-power stage 34 which has sub-stages 34A and 34B.

The output of the high-power stage 34 is fed to a switching system 35.

This is followed by a multiplexing and transmitting stage 36 whose output is fed to a single-input transmit antenna 37.

The channels are broadband channels (250 MHz to 500 MHz; without selection at the level of elementary channels greater than 6 MHz).

There are eight redundant systems: ½ in the receive part (decoder stage) and 9/12 in a ring configuration for the amplifier and high-power part (high-power stage).

For example:

the amplifier (TWTA) power is 5 W, the receiver frequency $F_0$ is 12 GHz, the output frequency $F_1$ is 30 GHz, the gain G/T is +7 dB/K, the signal/noise ratio EIRP is +41 dBW, the aperture of the transmit antenna beam is around 2° to 3°; and the transmit antenna diameter is 40 cm.

Table I sets out the mass and power balance.

The three-axis stabilized platform forming the intermediate satellite 3 is of the ARABSAT I type, for example, with one panel per array, an approximate launch mass of 1,200 kg for an approximate dry mass of 600 kg; the receive antenna is mounted on the +X face, for example, i.e. on the face perpendicular to the roll axis and facing away from the apogee thrust motor.

The other equipment of the three-axis stabilized satellite is of any appropriate known type and is not described in more detail here.

FIG. 3 shows the transmit-receive systems of the main satellite 2.

The satellite has a receive antenna 20 whose output drives a demultiplexer stage 21, each output of which is fed to a decoder stage 22 including an input filter 22A, a receiver circuit 22B and a filter 22C.

This is followed by a stage 23 and then an amplifier stage 24 and finally a stage 25. The output signals of the stage 25 are fed to filters 26 and then to eight unit transmit antennas 27 which are part of an output antenna 28.

The output beams are signals corresponding to a set of channels, for example (with modulation for TV coverage at multiples of 27 MHz, for example).

The output frequency is 12 GHz, as before.

The receiver antenna is tuned to the frequency $F_1$ (here between 30 GHz and 50 GHz, for example 30 GHz) and has a broadband output and a beam aperture of around 2° to 3°.

The broadband receive stage has a bandwidth covering all channels that the satellite is to transmit. Channel selection is handled by the demultiplexer stage.

The power amplifiers are of the 40 W TWTA type, configured as redundant rings.

The channels in each beam are multiplexed.

The transmit antenna transmits eight beams with an aperture of approximately 2°.

The EIRP is 50 dBW at the frequency $F_0$=12 GHz, for example.

Table II shows the weight and power balance.

An alternative implementation uses a "cluster" configuration, i.e. a plurality of intermediate satellites for one main satellite.

The transmit/receive systems of a satellite in a cluster of this kind can be extremely simple, with:

a receive antenna with one output, a transmit antenna with one input, a single system between these antennas, including (as before) an input filter, a receiver, an amplifier, a TWTA and a transmitter.

For example:

the uplink frequency is 14 GHz (or 17 GHz), the frequency retransmitted to the central satellite is 30 GHz, transmission is in a wide band (250 MHz) with no separation into channels (transparent), the fixed receiver antenna diameter is 50 cm, the fixed transmit antenna diameter is 30 cm.

Table III sets out the weight and power balances for a configuration of this kind.

It goes without saying that the foregoing description has been given by way of non-limiting example only and that numerous variations thereon can be put forward by the person skilled in the art without departing from the scope of the invention.

There is no reason for the intermediate satellites to meet the same requirements for orbit and attitude control as the main satellite. Alternatively, these satellites can have their own mission, whence the possibility of crossover interoperation with each of the two satellites providing a relay for the other, with two low frequencies and two intermediate frequencies.

The inter-satellite link can be of any appropriate known type (e.g. radio link or optical link).

TABLE I

| Balance | Number | Unit mass (kg) | Total mass (kg) | Unit power (W) | Total power (W) |
|---|---|---|---|---|---|
| Input filter | 8 | 0.2 | 1.6 | — | — |
| Receiver | 16 | 1.5 | 24 | 9 | 72 |
| Amplifiers | 12 | 0.5 | 6 | 6 | 48 |
| TWTA | 12 | 2.5 | 30 | 20 | 160 |
| Multiplexers (R) | 8 | 0.5 | 4 | — | — |
| Switches | 40 | | 5 | — | — |
| . . . | | 0.125 | 8 | | — |
| TOTAL (Repeater) | | | 78.6 | | 280 |
| Receive antenna (12 GHz) | | | 100 | | — |
| Transmit antenna (30 GHz) | | | 5 | | — |
| TOTAL (Payload) | | | 183.6 | | 280 |
| 10% Margin | | | 18.4 | | 28 |
| TOTAL | | | 202 | | 308 |

TABLE II

| Balance 8 beams × 16 channels | Number | Unit mass (kg) | Total mass (kg) | Unit power (W) | Total power (W) |
|---|---|---|---|---|---|
| Input filter | 8 | 0.2 | 1.6 | — | — |
| Receiver | 16 | 1.5 | 24 | 9 | 72 |
| Demultiplexer | 8 × 16 | 0.4 | 48 | — | — |
| Amplifiers | 8 × 20 | 0.4 | 64 | 5 | 640 |
| TWTA (40 W) | 8 × 20 | 4 | 640 | 80 | 1 024 |

TABLE II-continued

| Balance 8 beams × 16 channels | Number | Unit mass (kg) | Total mass (kg) | Unit power (W) | Total power (W) |
|---|---|---|---|---|---|
| Switches | 336 | 0.125 | 42 | — | — |
| RF cables | | | 60 | | — |
| TOTAL (Repeater) | | | 880 | | 10 950 |
| Receive antenna | | | 5 | | — |
| Transmit antenna | | | 120 | | — |
| TOTAL | | | 1 005 | | 10 950 |

TABLE III

| Balance | Number | Total mass (kg) | Total power (W) |
|---|---|---|---|
| Input filter | 1 | 0.2 | — |
| Receiver | 2 | 3 | 9 |
| Amplifier | 2 | 1 | 6 |
| TWTA | 2 | 8 | 20 |
| Output filter | 1 | 0.5 | 0.5 |
| TOTAL (Repeater) | | 12.7 | 35.5 |
| Receive antenna | | 5 | |
| Transmit antenna | | 4 | |

There is claimed:

1. A method of exchanging information between an earth-station and a satellite in geostationary orbit, said method comprising the steps of:

transmitting information signals addressed to said satellite to an intermediate satellite with an angular offset from said satellite in geostationary orbit on a first carrier frequency, said information signals addressed to said geostationary satellite being transmitted from said earth-station;

retransmitting said information signals addressed to said geostationary satellite laterally to said geostationary satellite in geostationary orbit on a second carrier frequency different from said first carrier frequency, said information signals addressed to said satellite being retransmitted from said intermediate satellite; and receiving information signals from said geostationary satellite on said first carrier frequency, said information signals from said geostationary satellite being received by said earth-station.

2. The method of exchanging information according to claim 1, wherein said method further comprises the step of selecting said first carrier frequency and said second carrier frequency such that said second carrier frequency is higher than said first carrier frequency.

3. The method of exchanging information according to claim 2, wherein said step of retransmitting said information signals addressed to said satellite includes selecting said second carrier frequency such that said second carrier frequency is equal to at least 30 GHz.

4. The method of exchanging information according to claim 1, wherein said method further comprises the steps of:

receiving said information signals addressed to said geostationary satellite and transmitted from said earth-station in parallel with other signals transmitted on said first carrier frequency from other earth-stations, said information signals transmitted from said earth-station and said other signals transmitted from said other earth-stations being received by said intermediate satellite;

multiplexing said information signals received from said earth-station and said other signals received from said other earth-stations, said information signals received from said earth-station and said other signals received from said other earth-stations being multiplexed by said intermediate satellite;

retransmitting said information signals and said other signals toward said satellite in geostationary orbit at said second carrier frequency, said information signals and said other signals being retransmitted by said intermediate satellite;

receiving said information signals and said other signals from said intermediate satellite, said information signals and said other signals being received by said satellite in geostationary orbit; and demultiplexing said information signals and said other signals retransmitted from said intermediate satellite, said information signals and said other signals retransmitted from said intermediate satellite being demultiplexed by said satellite in geostationary orbit.

5. The method of exchanging information according to claim 1, wherein said step of transmitting information signals addressed to said satellite includes selecting said angular offset such that said angular offset is equal to at least 2°.

6. The method of exchanging information according to claim 1, wherein said step of transmitting information signals addressed to said satellite includes selecting said angular offset such that said angular offset is equal to at least 10°.

7. The method of exchanging information according to claim 1, wherein said method further comprises the step of positioning said intermediate satellite in a geostationary orbit.

8. A system for transmitting information, said system comprising:

an earth-station having a transmitter and a receiver;

a satellite in geostationary orbit, said satellite having a receiver and a transmitter, said transmitter of said satellite and said receiver of said earth-station pointed toward each other and tuned to a first carrier frequency; and an intermediate satellite offset angularly from said satellite in geostationary orbit, said intermediate satellite having an intermediate receiver and an intermediate transmitter, said transmitter of said earth-station and said intermediate receiver pointed toward each other and tuned to said first carrier frequency, said intermediate transmitter of said intermediate satellite and said receiver of said geostationary satellite pointed laterally toward each other and tuned to a second carrier frequency.

9. The system for transmitting information according to claim 8, wherein said second carrier frequency is higher than said first carrier frequency.

10. The system for transmitting information according to claim 9, wherein said second carrier frequency has a value equal to at least 30 GHz.

11. The system for transmitting information according to claim 8, wherein said transmitter of said earth-station and said receiver of said earth-station have a pointing difference equal to at least 2°.

12. The system for transmitting information according to claim 8, wherein said transmitter of said earth-station and said receiver of said earth-station have a pointing difference equal to at least 10°.

13. The system for transmitting information according to claim 8, wherein said intermediate receiver and said intermediate transmitter conjointly include a receive antenna mounted on said intermediate satellite, a receiver stage connected to said receive antenna, an amplifier stage connected to said receiver stage, a multiplexer and transmitter stage connected to said amplifier stage, and a transmit antenna connected to said multiplexer and transmitter stage, and wherein said receiver of said geostationary satellite and said transmitter of said geostationary satellite conjointly include a receive antenna mounted on said geostationary satellite, a demultiplexer stage connected to said receive antenna, a receiver stage connected to said demultiplexer stage, an amplifier stage connected to said receiver stage, a transmitter stage connected to said amplifier stage, and a transmit antenna connected to said transmitter stage.

14. The system for transmitting information according to claim 8, wherein said intermediate satellite has a position in geostationary orbit, and wherein said intermediate transmitter of said intermediate satellite and said receiver of said geostationary satellite each have positions such that said intermediate transmitter of said intermediate satellite and said receiver of said geostationary satellite point toward each other.

\* \* \* \* \*

UNITED STATES PATENT AND TRADEMARK OFFICE
CERTIFICATE OF CORRECTION

PATENT NO. : 5,615,407  
DATED : March 25, 1997  
INVENTOR(S) : Barkats

Page 1 of 2

It is certified that error appears in the above-identified patent and that said Letters Patent is hereby corrected as shown below:

Column 1, line 35, after "reason" kindly insert ---- for this is to avoid interference associated with the LARSEN effect. ----.

Column 2, line 57, kindly delete "having" and insert ---- have ----.

Column 4, line 31, kindly delete "reference" and insert ---- referenced ----.

Column 7, line 42, after "said" second occurrence, kindly insert ---- geostationary ----.

Column 7, line 55, after "said" first occurrence, kindly insert ---- geostationary ----.

UNITED STATES PATENT AND TRADEMARK OFFICE
CERTIFICATE OF CORRECTION

PATENT NO. : 5,615,407
DATED : March 25, 1997
INVENTOR(S) : Barkats

It is certified that error appears in the above-identified patent and that said Letters Patent is hereby corrected as shown below:

Column 8, line 37, after "said" first occurrence, kindly insert

---- geostationary ----.

Column 8, line 41, after "said" first occurrence, kindly insert

---- geostationary ----.

Column 8, line 51, after "said" second occurrence, kindly insert

---- geostationary ----.

Signed and Sealed this

Twenty-second Day of December, 1998

Attest:

BRUCE LEHMAN

*Attesting Officer*         *Commissioner of Patents and Trademarks*